Dec. 24, 1968  T. A. HOFFMANN  3,418,052
APPARATUS FOR ALIGNING A REFLECTOR AND A LIGHT SOURCE
Original Filed Dec. 5, 1961  3 Sheets-Sheet 1
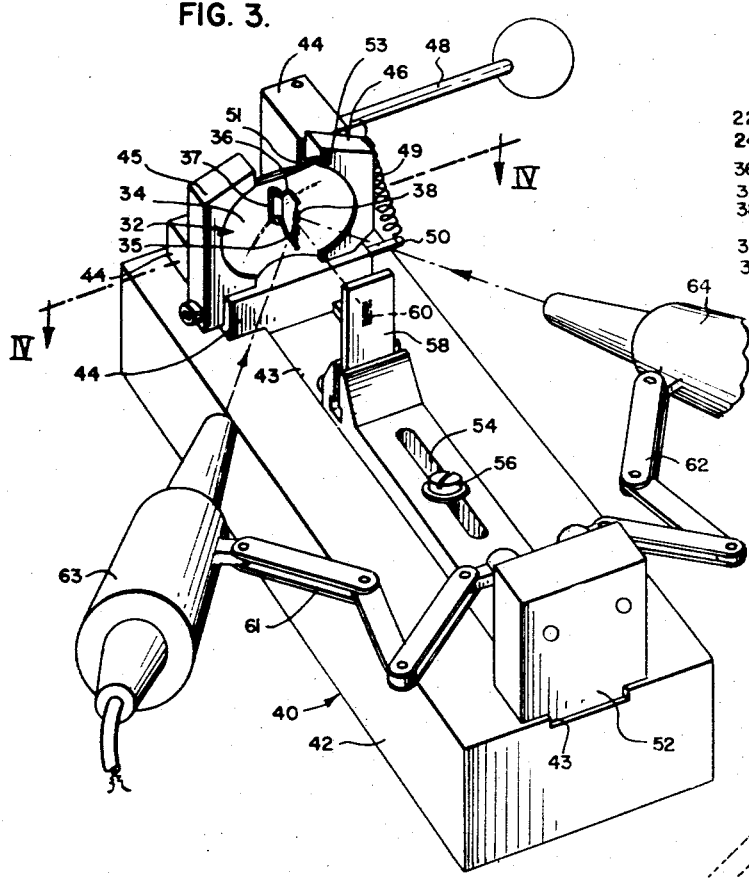
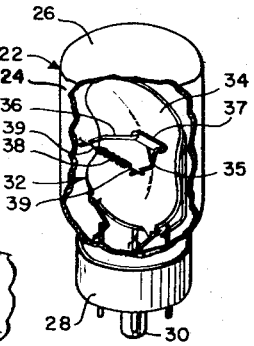
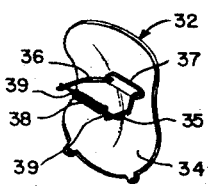
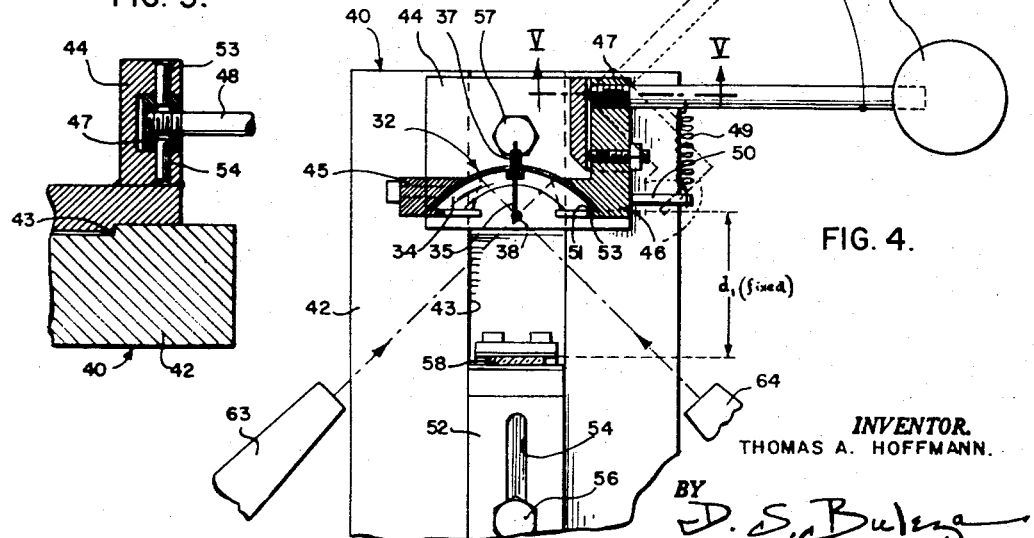
INVENTOR.
THOMAS A. HOFFMANN.
BY D. S. Buleza
AGENT.

INVENTOR.
THOMAS A. HOFFMANN.
BY
AGENT.

Dec. 24, 1968     T. A. HOFFMANN     3,418,052
APPARATUS FOR ALIGNING A REFLECTOR AND A LIGHT SOURCE
Original Filed Dec. 5, 1961                3 Sheets-Sheet 3

INVENTOR.
THOMAS A. HOFFMANN.
BY D. S. Buleza
AGENT.

United States Patent Office 3,418,052
Patented Dec. 24, 1968

3,418,052
APPARATUS FOR ALIGNING A REFLECTOR AND A LIGHT SOURCE
Thomas A. Hoffmann, Morris Plains, N.J., assignor to Westinghouse Electric Corporation, East Pittsburgh, Pa., a corporation of Pennsylvania
Original application Dec. 5, 1961, Ser. No. 157,217, now Patent No. 3,194,626. Divided and this application Nov. 16, 1964, Ser. No. 411,260
6 Claims. (Cl. 356—123)

ABSTRACT OF THE DISCLOSURE

An apparatus for determining the position of a component, such as a filament, relative to a curved reflector to which it is attached and detecting deviations, if any, from a given alignment. The reflector-filament assembly is locked in predetermined position of a chassis which carries a screen and a light source that are so oriented with respect to each other and the assembly that a shadow of the filament is projected by the reflector onto the screen when the light source is energized. The position of the projected shadow relative to a reference mark on the screen indicates the degree of misalignment, if any, between the reflector and filament.

---

This application is a division of copending application Serial No. 157,217, filed December 5, 1961, now U.S. Patent No. 3,194,626.

This invention relates to optical systems and, more particularly, to an improved apparatus for accurately aligning the light source and reflector components of an electric projection lamp.

In the manufacture of certain types of devices it is frequently necessary that an element be precisely located with respect to a curved reflector surface. In the case of electric projection lamps having integral reflectors, for example, it is essential that the filament be located in predetermined relation with respect to the focal point of the reflector in order to obtain the desired beam pattern and intensity. Due to the construction of such lamps and the precision required, it has been found that the alignment of the filament and reflector must be done before the envelope is sealed and exhausted. The filament accordingly cannot be lighted during the prefocusing operation, as is done in the case of other lamp types, since it would rapidly oxidize in the atmosphere and be ruined. Because of this restriction various types of optical measuring devices are used to locate the focal point of the reflector before the envelope is sealed so that the filament can be mounted on its supporting structure in the desired position relative to the focal point. This method of prefocusing leaves much to be desired since it is a time-consuming operation and requires complicated and expensive measuring and filament-mounting apparatus.

It is accordingly the general object of this invention to provide a simpler and less expensive means for accurately positioning an element with respect to a reflector surface.

Another and more specific object is the provision of apparatus that will permit the filament and reflector components of an electric lamp to be prefocused on a production line basis without energizing the filament.

Another object is the provision of an inexpensive rugged device that can be easily operated and will quickly check the alignment of an element and a curved reflector surface and facilitate the correction of any misalignment.

The foregoing objects, and others which will become apparent to those skilled in the art as the description proceeds, are achieved in accordance with this invention by utilizing the curved reflector surface itself as the mirror portion of an optical system for checking the alignment of the deenergized filament or other element. Briefly, a beam of radiant energy is aimed at the element from a predetermined angle and the position of the element relative to the reflector surface is checked by observing the orientation of the reflected shadow of the element on a screen that detects the type of radiant energy employed. In the case of a reflector having a focal point, two beams are preferably aimed at the reflector at angles such that the beam axes intersect in the region of the focal point so that two reflected shadows of the element appear on the screen. By observing the positions of the shadows relative to reference marks on the screen even minute misalignments can be very readily detected and corrected. In the case of a reflector and a filament, light beams and a frosted glass screen are employed.

Utilizing the aforesaid principle, suitable light sources and a screen are mounted on a common base or support together with a jig for holding the reflector to provide a prefocusing apparatus that is compact and very simple to operate.

A better understanding of the invention will be obtained by referring to the accompanying drawings, wherein:

FIGURE 1 is a perspective view of an incandescent projection lamp that contains an integral reflector and is representative of the type of lamp with which the invention is concerned, a part of the lamp envelope being broken away to reveal the lamp mount;

FIG. 2 is a perspective view of the integral reflector-filament assembly employed in the lamp shown in FIG. 1;

FIG. 3 is a perspective view of prefocusing apparatus embodying the invention;

FIG. 4 is a fragmentary plan view of the apparatus shown in FIG. 3, the holding jig portion whereof and the inserted reflector-filament assembly and screen being shown in cross section, the view being taken along the line IV—IV of FIG. 3, in the direction of the arrows;

FIG. 5 is a fragmentary cross-sectional view through the movable jaw of the holding jig taken along the line V—V of FIG. 4, in the direction of the arrows;

Figure 6:
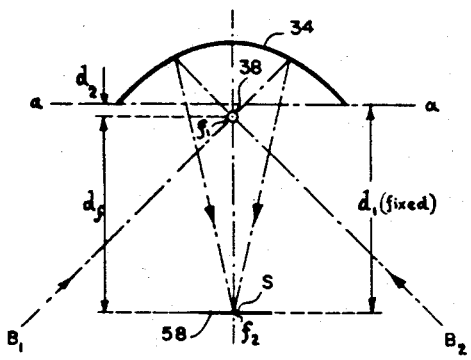
FIGS. 6, 8, 10 and 12 are diagrammatic views illustrating the different optical effects obtained with various filament locations in the case of an ellipsoidal reflector.

FIGS. 7, 9, 11 and 13 are fragmentary elevational views of the screen illustrating the orientation of the reflected shadows of the filament on the screen produced by the various situations depicted in FIGS. 6, 8, 10 and 12, respectively; and FIGS. 14 to 21 are illustrations corresponding to FIGS. 6 through 13 but show various alignments and resultant screen patterns that would be observed in the case of a parabolic reflector.

While the present invention can be advantageously employed in the manufacture of various types of devices that include a reflector element which must be precisely oriented with respect to another component, it is particularly adapted for use in conjunction with electric lamps having an integral reflector and a concentrated light source, such as incandescent projection lamps, and the invention has accordingly been so illustrated and will be so described.

With specific reference to the drawings, in FIG. 1 there is shown an incandescent projection lamp 22 representative of the type of integral-reflector lamp that presents the troublesome prefocusing problems with which this invention deals. As is well known, such lamps consist in general of a sealed tubular envelope 24 that has an opaque coating 26 at one end and a base 28 at the other end. The base is provided with a keyed center post 30 to insure that the lamp is properly inserted into its socket. Sealed into the envelope is an ellipsoidal metal reflector 34 and a concentrated filament 38 of suitable refractory metal such as tungsten or the like.

The filament 38 is supported at or proximate the focal point of the reflector 34 by a pair of spaced lead wires 35 and 36 which, in turn, are attached to but insulated from the reflector by a ceramic insulator 37 that is seated in a suitable opening in the reflector. The aforesaid elements comprise a separate integral assembly 32 which will hereafter be referred to as the "reflector-filament" assembly. This assembly is supported within the envelope by a plurality of support members and conjoined lead-in conductors that pass through the wafer type stem sealed to the end of the envelope and serve as pin terminals for energizing the filament. The reflector 34 can be fabricated from glass coated with silver or the like, or it can be stamped from metal and subsequently reflectorized as in the case here illustrated.

A detailed illustration and description of a projection lamp of the aforesaid design is set forth in U.S. Patent No. 2,980,818, issued Apr. 18, 1961.

As shown more particularly in FIG. 2, the filament 38 is of coiled-coil construction and is provided at each end with uncoiled leg sections 39 which are attached as by welding or the like to the spaced lead wires 35 and 36. The position of the coiled body portion of the filament relative to the focal point of the ellipsoidal reflector 34 can, accordingly, be very readily altered by bending the tips of the lead wires or the adjoining uncoiled leg sections of the filament before the reflector-filament assembly 32 is attached to its support wires and sealed into the envelope.

A preferred form of apparatus 40 for practicing the present invention is shown in FIG. 3, which apparatus comprises an elongated base plate or chassis 42 having a longitudinally extending track such as a groove or channel 43 in its upper face. A jig 44 for holding the reflector-filament assembly 32 in predetermined position relative to the channel is located at one end of the chassis and a carrier 52 is located at the other end. The bottoms of the jig 44 and carrier 52 are contoured to interfit with the channel 43 so that both of these members are movable toward and away from each other along a predetermined axis defined by the channel 43. The holding jig 44 can be locked at a given position along the channel by suitable means such as a set screw 57 (see FIG. 4). The carrier 52 is also made adjustable as by providing an elongated slot 54 in its central portion and a set screw 56 that fits loosely within the slot and engages a threaded hole in the chassis.

The restricted light beams required by the invention are obtained by attaching a pair of suitable light sources 63 and 64 to the carrier 52 by adjustable arms 61 and 62. The light sources are located adjacent the path of movement of the carrier on opposite sides thereof and are so constructed as to direct a restricted beam of light toward the holding jig 44 at predetermined angles with respect to the channel 43. The end of the carrier nearest the jig is suitably slotted and supports a screen 58 of ground glass or the like upon which is inscribed a suitable reference mark such as a rectangular box 60.

To facilitate the loading and unloading of the reflector-filament assembly 32 and lock it in a predetermined position with respect to the channel 43, screen 58 and light sources 63 and 64, the holding jig 44 is provided with two upstanding clamping jaws 45 and 46 the inwardly disposed work faces whereof are spaced and contoured nestingly to receive the circular peripheral edges of the reflector 34, as shown in FIGS. 3 and 4. Since oppositely disposed segments of the reflector are cut away to permit the reflector-filament assembly 32 to be inserted into the tubular envelope 24, this arrangement insures that the assembly is automatically oriented in the proper position when it is placed between the jaws.

The clamping jaw 46 is rotatable about an axis perpendicular to the longitudinal axis of the chassis 42 so as to be swingable toward and away from the other clamping jaw 45 by means of a lever 48, as shown by the dotted line portions of FIG. 4. The lever 48 is preferably connected by a spring 49 to a pin 50 located on the lower part of the jig. The movable jaw 46 is thus maintained by the action of the spring in seated engagement with the edge of the reflector 34 thereby positively locating the reflector-filament assembly in the holding jig 44.

As shown in FIGS. 4 and 5, one convenient arrangement for rotatably coupling the jaw 46 to the jig 44 is to provide the jaw with a laterally projecting arm 47 the end portion whereof fits into an opening in the jig and is suitably apertured to receive and pivot around a pair of pins 53 and 54 (FIG. 5) seated in the jig. The lever 48 is fastened to the movable jaw 46 in any suitable manner as by threading the end of the lever and screwing it into a threaded aperture provided in the arm 47, as illustrated most particularly in FIG. 5.

As is shown in FIGS. 3 and 4, the work faces of the clamping jaws 45 and 46 are cut away to provide a groove 51 and a projecting lip 53 threat which define a cavity that nestingly receives the circular peripheral edges of the reflector 34. Hence, when the reflector-filament assembly 32 is inserted into the holding jig 44, the positive seating action of the jaws locks the assembly in such a position that the axis of revolution of the reflector is parallel to the axis of the channel 43 and the filament 38 is perpendicular to the latter. Thus, in the case of an ellipsoidal reflector 34 of the type here shown, when the beams from the light sources 63 and 64 are oriented so that the beam axes intersect at the first focal point of the reflector and the carrier 52 is so adjusted so that the screen 58 is located a fixed distance $d_1$ therefrom at the second focal point of the reflector (see FIG. 4), the reflected shadows of the filament 38 projected onto the screen by the reflector will coincide and a single shadow will appear in the reference box 60, as shown in FIG. 3, if the filament is located precisely at the first focal point.

The above-described arrangement is diagrammatically illustrated in FIG. 6. As there shown, the coiled filament 38 is located at the first focal point $f_1$ of the ellipsoidal reflector 34 and the screen 58 is located a fixed distance $d_1$ from the plane $a$—$a$ tangent to the edges of the reflector such that the screen is located at the second focal point $f_2$. The reflector is of such a depth in this particular case that the focal point $f_1$ is outside the reflector and is spaced from the cutoff plane $a$—$a$ a predetermined distance $d_2$. The light beams $B_1$, $B_2$ are aimed so that the beam axes intersect approximately at the first focal point $f_1$ thereby causing the two reflected shadows of the filament to merge and overlap at the second focal point $f_2$. Under these conditions a single shadow S of the filament will appear within the reference box 60 inscribed on the screen 58 indicating that the filament is located precisely at the first focal point $f_1$ of the reflector.

Figure 8:
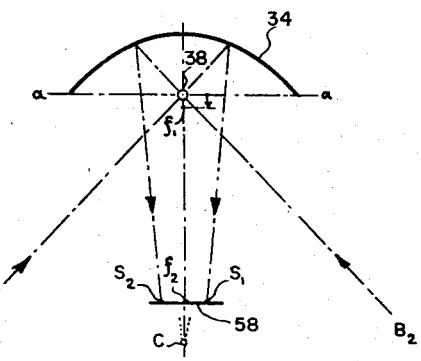
Figure 7:
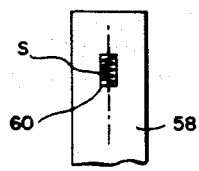
Figure 9:
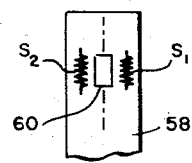

If the filament 38 is located at a point closer to the reflector 34 than the first focal point $f_1$ and on the reflector axis, then the reflected shadows of the filament will overlap at some point C located a considerable distance beyond the screen 58. This condition is illustrated in FIG. 8 and results in two shadows $S_1$ and $S_2$ on the screen. As shown in FIG. 9, these shadows will be in line with the reference box 60 but spaced equal distances on either side thereof.

Figure 10:
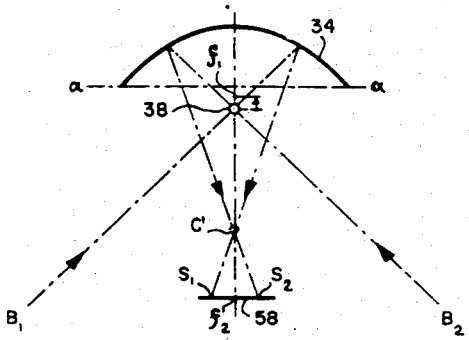

Should the filament 38 be located beyond the first focal point $f_1$ at a point on the reflector axis, then the reflected filament shadows will overlap at a point C' located somewhere between the screen 58 and the filament. This situation is shown in FIG. 10 and, since the reflected light beams diverge after intersecting, it also results in the appearance of two shadows $S_1$ and $S_2$ on the screen. As will be noted in FIG. 11, the orientation of the reflected shadows relative to the reference box 60 on the screen corresponds to that which results when the filament is located closer to the reflector than the first focal point $f_1$ as in the case illustrated in FIGS. 8 and 9. However, because the reflected light beams intersect and then diverge the position of the reflected shadows on the screen are inverted in this instance.

Figure 12:
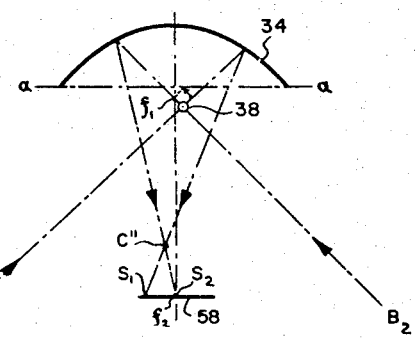
Figure 11:
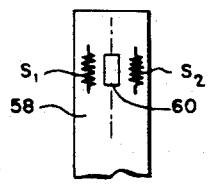
Figure 13:
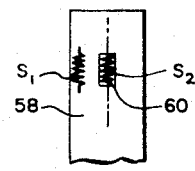

In the event the filament 38 is located at a point beyond the first focal point $f_1$ and to the right thereof, as is shown in FIG. 12, then the reflected shadows $S_1$ and $S_2$ of the filament will be shifted to the left of the screen 58 when the latter is viewed from the rear. If the filament were in line with beam $B_2$ and the focal point $f_1$ as illustrated, the shadow $S_1$ would appear at the left-hand edge of the screen and the other shadow $S_2$ would appear inside the reference box 60, as shown in FIG. 13.

Since the screen intercepts the reflected light beams and shadows of the filament, the deviation of the filament shadows from the point of reference on the screen is in the reverse direction from that of the actual misalignment of the filament with respect to the focal point of the reflector. For example, if the filament is located to the right of the focal point $f_1$ then the reflected shadows of the filament on the screen will be shifted to the left of the reference mark, as in the case illustrated in FIGS. 12 and 13. Hence, the filament must be moved to the left toward $f_1$ and back toward the reflector to produce a resultant shift to the right and convergence of the filament shadows on the screen. The direction in which the filament must be moved to correct for each misalignment is indicated by small arrows in each of the figures.

Thus, with a little experience an operator simply by observing the location and movement of the reflected shadows of the filament on the screen can very quickly position the filament precisely at the focal point $f_1$.

Since the beam axes intersect at the focal point $f_1$, it should be noted that the beams themselves overlap for a considerable distance beyond the focal point. Hence, the filament can also be very readily positioned accurately at any point offset and proximate the focal point $f_1$ that lies within the region of beam overlap.

The position of the filament 38 is preferably adjusted by bending the uncoiled leg sections adjacent the lead wires. However, the adjustment may also be made by bending the lead wires themselves, particularly if the filament must be moved a considerable distance.

Figure 14:
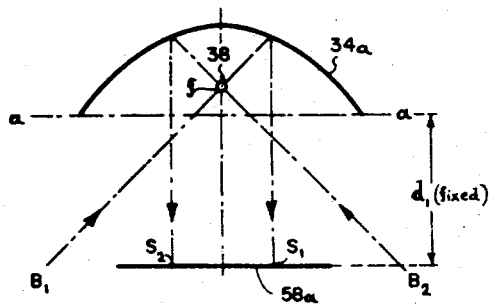
Figure 15:
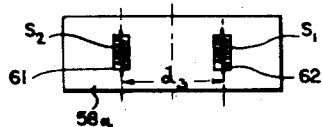

The principles of this invention are also applicable to other types of curved reflector surfaces. For example, the same advantageous results can be obtained with parabolic reflectors of the type used in sealed beam automotive lamps. Since light rays passing through the focal point of parabolic reflectors are reflected in a direction parallel to the reflector axis and are not focused at a second focal point as in the case of an elliptical reflector, the screen in this case must be made larger or two separate screens separated a fixed distance apart must be used in order to intercept the more widely spaced reflected shadows of the filament. In FIG. 14 there is shown one suitable arrangement for checking and adjusting the position of a filament 38 with respect to the focal point $f$ of a parabolic reflector 34a wherein a wide screen 58a having two reference boxes 61 and 62 separated a predetermined distance $d_3$ apart is used. When the filament 38 is located precisely at the focal point $f$ of the reflector, as here illustrated, the reflected filament shadows $S_1$ and $S_2$ will be centered within the respective reference boxes as shown in FIG. 15.

Figure 16:
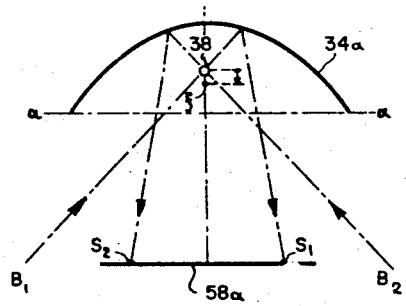
Figure 17:
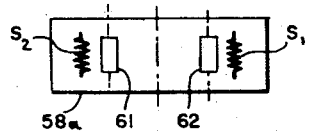

However, if the filament is located between the reflector and its focal point $f$ and on axis of the reflector, as in the case shown in FIG. 16, then the reflected filament shadows $S_1$ and $S_2$ will be shifted outwardly approximately equal distances toward the sides of the screen. The shadows will, accordingly, be located outside the boxes 61, 62 proximate the outer edges of the screen as shown in FIG. 17.

Figure 18:
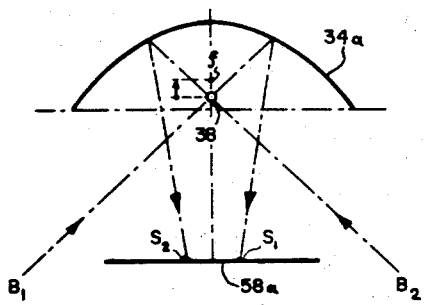
Figure 19:
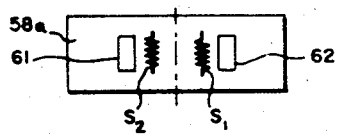

Should the filament be on the reflector axis but between the focal point and the screen, as illustrated in FIG. 18, then the reflected filament shadows $S_1$ and $S_2$ will be shifted toward one another and be located approximately equal distances inwardly of and in line with the reference marks on the screen, as is illustrated in FIG. 19.

Figure 20:
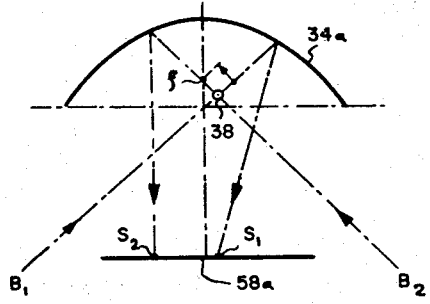
Figure 21:
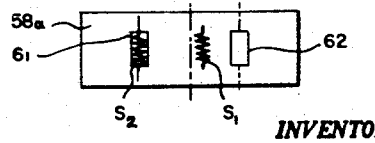

In the event the filament 38 is located to the right of the reflector axis between the focal point $f$ and the screen 58a then the reflected filament shadow $S_1$ produced by the light beam $B_1$ will be shifted toward the left of the screen. If in this case the filament were located on the axis of the light beam $B_2$, as shown in FIG. 20, then the reflected shadow $S_2$ produced by this beam will be centered in the left-hand box 61 on the screen whereas the reflected shadow $S_1$ produced by beam $B_1$ will be located somewhere between the reference marks, as depicted in FIG. 21.

In order to maintain the width of the filament shadow as near as possible to the width of the actual filament the beams $B_1$, $B_2$ are preferably aimed so that the angle between each of the beams and the reflector axis is in each case not more than about 45°.

It will be obvious from the foregoing that the present invention can be employed to check the alignment of an element with respect to curved reflector surfaces of various configurations and that one instead of two beams of light can be used. By observing the orientation of the reflected shadow of the element with respect to a preselected reference point on a screen located at a predetermined distance and position from the reflecting surface, it is possible to locate the element with the same degree of accuracy as when two beams are used. Also, the element can remain stationary and the reflector moved to obtain the desired alignment.

It will also be obvious to those skilled in the art that other forms of radiant energy other than light beams can also be employed to project a reflected shadow of the element onto a screen. For example, restricted beams of ultraviolet rays, X-rays, infrared rays or gamma rays and other forms of electromagnetic radiation can be employed, providing the reflecting surface reflects such energy and the element absorbs or has a much lower coefficient of reflectivity than the reflecting surface for the particular type of energy involved. Of course, the screen must be of a type that detects or is responsive to the reflected radiant energy so as to permit the position of the reflected shadow of the element to be observed or otherwise determined. For example, in the case of UV beams the viewing screen can comprise a surface that is coated with a phosphor that is responsive to UV and will thus visibly indicate the location of the reflected shadow or shadows.

It will be apparent from the foregoing that the objects of the invention have been achieved in that an inexpensive simple apparatus for accurately prefocusing the light source and integral reflector of an electric lamp on a production line basis has been provided.

While one form of prefocusing apparatus has been described, it will be appreciated that various structural modifications can be made therein without departing from the spirit and scope of the invention. For example, the positions of the screens and radiant energy sources in any of the arrangements set forth above can be reversed to obtain the same optical effects and rapid indication of misalignment as that described.

I claim as my invention:

1. Apparatus for determining the position of a component relative to a concave reflector to which it is attached, said apparatus comprising; a chassis having a longitudinal axis, holding means on said chassis for holding said reflector in a position such that its concave reflective surface faces toward the longitudinal axis of said chassis, means on said chassis for directing two beams of radiant energy toward said holding means at an angle of incidence relative to the concave reflective surface of a reflector placed in said holding means and along paths such that the beam axes pass through the component attached to said reflector, and a screen on said chassis at a location relative to said holding means, the longitudinal axis of said chassis, and said beam axes that it intercepts the beams of radiant energy reflected by the reflector placed in said holding means and indicates the position of the component relative to said reflector by the location of the projected shadows of said component relative to a reference area on said screen.

2. Apparatus for checking the position of a concentrated filament relative to the focal point of a concave reflector to which it is attached and indicating the degree of misalignment, if any, of said filament from a preselected position, said apparatus comprising; an elongated chassis having a longitudinal axis, a holder at one end of said chassis having portions contoured to nestingly receive and provide a seat for preselected portions of said reflector so that the reflector axis is parallel to said longitudinal axis, a carrier attached to said chassis, light source means on said carrier for directing two beams of light onto the concave surface of the reflector in said holding means from locations adjacent to but on opposite sides of the axis of said reflector and along axes that pass through the filament attached to said reflector, and a screen on said carrier at a location relative to said holding means and beam axes that it intercepts the reflected light beams from said reflector and, by means of the shadows of the filament projected onto a reference area on said screen, indicates the position of the filament relative to the reflector.

3. The apparatus set forth in claim 2 wherein; and holding means comprises a jig having two upstanding clamping jaws that are spaced and contoured to grip the peripheral edges of said reflector and lock it in position on said chassis, and said carrier is movable along a channel in said chassis that extends along the direction of the longitudinal axis thereof so that the spacing between said carrier and jig can be varied.

4. The apparatus set forth in claim 3 wherein one of said clamping jaws is rotatable about an axis that is normal to the longitudinal axis of said chassis and is thereby swingable toward and away from the other of said clamping jaws.

5. The apparatus set forth in claim 3 wherein said light source means comprises a pair of light sources that are attached to said carrier by adjustable arms.

6. The apparatus set forth in claim 3 wherein; said jig is also movable along said channel, said clamping jaws are so disposed that the axis of a reflector locked therein is substantially parallel with the channel in said chassis, said screen is located at the end of said carrier proximate said jig, and said light source means comprises a pair of light sources that are attached to the other end of said carrier by means which permit said light sources to be aimed at said jig from opposite sides of said channel.

References Cited

UNITED STATES PATENTS

| | | |
|---|---|---|
| 1,660,833 | 2/1928 | Cronjaeger. |
| 1,705,356 | 3/1929 | Bohner _____ 88—14 |

JEWELL H. PEDERSEN, *Primary Examiner.*

A. A. KASHINSKI, *Assistant Examiner.*

U.S. Cl. X.R.

316—29